Feb. 12, 1946.   J. M. STRANG   2,394,880
RANGEFINDER, HEIGHTFINDER, AND LIKE OPTICAL MEASURING INSTRUMENTS
Filed March 19, 1942   2 Sheets-Sheet 1

INVENTOR
J. Martin Strang
BY
Cameron, Kerkam & Sutton
ATTORNEYS

Feb. 12, 1946. J. M. STRANG 2,394,880
RANGEFINDER, HEIGHTFINDER, AND LIKE OPTICAL MEASURING INSTRUMENTS
Filed March 19, 1942 2 Sheets-Sheet 2
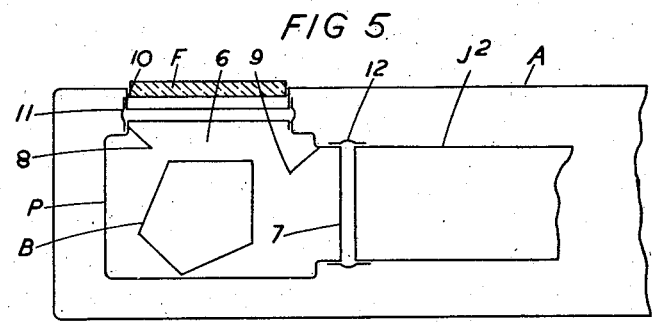
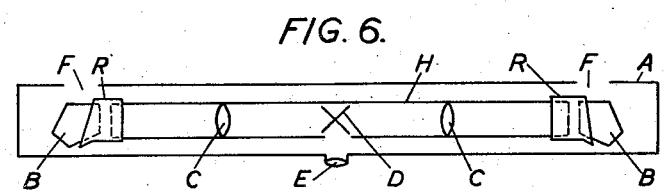
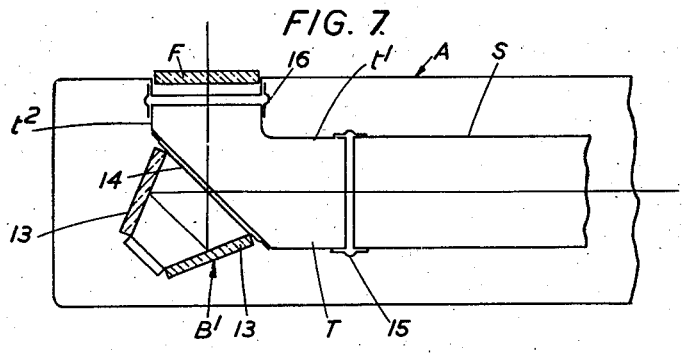
INVENTOR
J. Martin Strang
BY
Cameron, Kerkam & Sutton
ATTORNEYS Patented Feb. 12, 1946

2,394,880

UNITED STATES PATENT OFFICE 2,394,880

RANGE FINDER, HEIGHT FINDER, AND LIKE OPTICAL MEASURING INSTRUMENTS

John Martin Strang, Glasgow W. 3, Scotland, assignor to Barr and Stroud, Limited, Glasgow, Scotland Application March 19, 1942, Serial No. 435,353
In Great Britain November 14, 1939

8 Claims. (Cl. 88—2.6)

This invention refers to rangefinders, heightfinders, and like self-contained base optical measuring instruments.

Instruments of this type commonly comprise a tubular base casing, windows near the ends of the base casing for the entrance of light from the object under observation, a reflector at each end of the base to direct light inwardly along the base to a more or less central position, an objective in each inwardly directed beam of light, and a central reflecting system whereby the two inwardly directed beams of light are deflected to the eye or eyes of the observer, the central reflecting system and the two objectives being carried in an inner tube or frame (hereinafter referred to as the inner frame) which is short compared with the distance between the end reflectors.

With instruments of this construction, it is found that errors tend to occur when the plane of observation is inclined to the horizontal, due to the existence of a temperature gradient in the air within the base casing, the temperature of the air varying from the lower to the upper part of the casing and the refractive index of the air varying with the temperature.

The source of error referred to can be substantially eliminated according to the present invention, by the provision, on one or both sides of the central reflecting system, of a tubular member extending within the base casing from or from close to, the end reflector towards the central reflecting system to form a closed or substantially closed inner column of air, at normal pressure, for the path of the beam of light proceeding from the end reflector towards the central reflecting system, the column being closed in that it is shut off from the rest of the interior of the base casing and unconnected with the exterior of the instrument.

As the introduction of additional optical parts involves additional loss of light in the instrument, preferably the normal optical members, i. e., optical members which are carried by the inner frame and the base casing and which are otherwise required in the instrument are made to serve for the closure of the inner tubular member provided in acordance with the invention, i. e. without the introduction of special optical closure parts. Thus the objective located in the inner frame on the one hand and the end reflector or adjacent entrance window (or both) on the other hand can be utilised for effecting closure of the tubular member.

Where the inner frame, as is frequently the case, is itself a closed or substantially closed tube, the path of the beam of light for the whole or aproximately the whole of the distance from the end reflector to the central reflecting system is, in accordance with this invention, through a closed or substantially closed inner column of air.

The invention may be carried into practice by interposing a supplementary length of tubing between the end of the inner frame and the end reflector. Alternatively, in certain circumstances the inner frame tube may itself be arranged to extend laterally to or nearly to the end reflector.

The tubing which forms the column of air may be composed of a material which is a good conductor of heat, for example, copper.

The invention will now be described with reference to the accompanying drawings, in which—

Figure 7 shows a fifth example.

Figure 1:
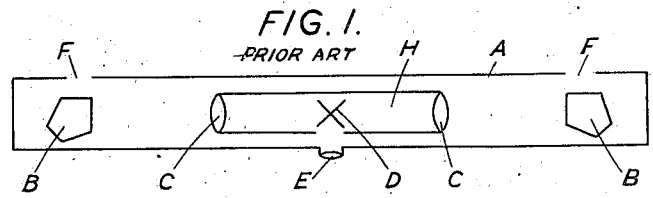
Figure 1 shows a standard type of rangefinder.

The instrument shown in Figure 1 is of the coincidence type and comprises a base casing A, end pentagonal prisms B, objectives C, a central reflecting system D, an eyepiece system E, and entrance windows F in the casing A. The central reflecting system D and the two objectives C are carried by an inner frame H of tubular form which is short relative to the base length of the instrument. This is a well known construction of rangefinder.

Figure 2:
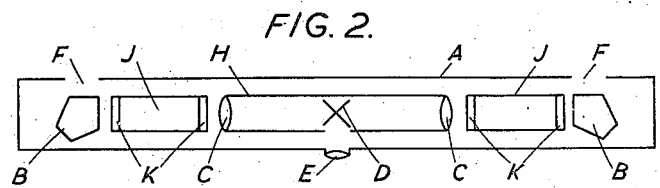
Figure 2 illustrates a first example of construction in accordance with the invention.

Referring now to Figure 2, the instrument shown is of the same construction as shown in Figure 1, with the addition of two supplementary tubes J, one interposed between each pentagonal prism B and the adjacent objective C. These tubes J are of approximately the same diameter as the inner frame H and are separate from the inner frame H, and each is closed by glass windows K. The tubes J are preferably composed of copper.

Figure 3:
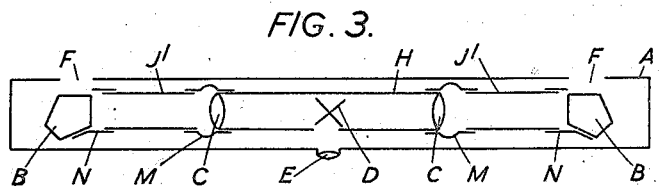
Figure 3 shows a second example of construction.
Figure 4:
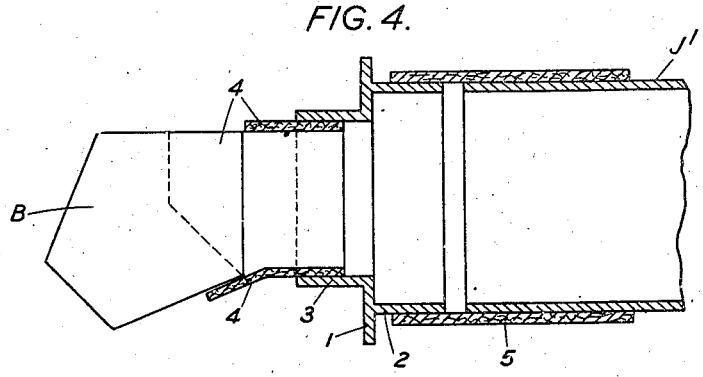
Figure 4 shows on a larger scale details of the construction illustrated in Figure 3, Figures 5 and 6 show a third and fourth example of construction, respectively.

Additional glass windows such as K would cause considerable loss of light and in order to utilise normal optical parts of the instrument to close supplementary tubes such as J, the arrangement shown in Figures 3 and 4 may be adopted. Supplementary tubes $J^1$ are used, each of which is connected by a flexible sleeve connection M to the adjacent end of the inner frame H and by a flexible connection N to the pentagonal prism B, so that the tube J¹ is closed at one end by the objective C and at the other end by the prism B. An intermediate coupling member is used between the tube J¹ and the prism B, see Figure 4, comprising a circular metal ring 1 with a circular tubular part 2 on one side and a square tubular part 3 on the other side. The tubular part 3 carries projecting flaps 4 composed of felt. A sleeve 5 of felt is used to connect the supplementary tube J¹ to the part 2 of the coupling member, while the flaps 4 bear on the faces of the pentagonal prism B sufficiently closely to form what is, for practical purposes, a seal.

As an alternative to the flexible sleeve arrangement, adjacent tubular parts may overlap in sleeve fashion with a degree of clearance insufficient to allow free flow of air between them.

In the example shown in Figure 5, the pentagonal prism B is located within a prism chamber P having two openings 6 and 7 with circular flanges 8 and 9, respectively, around them. The opening 6 faces the entrance window F. A circular flange 10 extends inwardly around window F and the flanges 8 and 10 are connected by a flexible tubular sleeve 11. The opening 7 faces the supplementary tube J² and the flange 9 of the opening 7 is connected to the adjacent end of the tube J² by a flexible sleeve 12. In this case closure of the tube J² is effected on the one hand by the objective C and on the other hand by the entrance window F. This arrangement is suitable where a built-up end reflector is used instead of a solid pentagonal prism.

Figure 6 shows an arrangement in which the inner frame H is extended so as to terminate close to the pentagonal prisms B and flexible connections R are provided between the pentagonal prisms B and the adjacent ends of the frame H.

Figure 7 shows another example embodying a built-up end reflector B¹, the reflector B¹ comprising two mirrors 13 supported at appropriate angles in a frame constituting a box of which the mirrors 13 form two opposite sides and which is closed except at the side 14. The tubular member S shown in Figure 7 may correspond with either the tubular inner frame H of the instrument extended as in Figure 6 or it may be a supplementary tube corresponding with the part J¹ of Figures 2 and 4 or the part J² of Figure 5. In Figure 7, a tubular casing T is provided consisting of two limbs t¹ and t² at right angles to one another with a part cut away at the bend to form an opening. The built-up reflector B¹ is attached to the casing T so as to close the corner opening therein, and the limb t¹ of the casing T is connected to the tubular member S by means of a flexible sleeve 15 and the limb t² is connected to the window opening of the base casing A by a flexible sleeve 16. There is thus a closed column of air from the window F inwards towards the central reflecting system of the instrument.

I claim:

1. A rangefinder or like self-contained base optical measuring instrument including a tubular base casing, windows near the ends of the base casing, a reflector at each end of the base casing, a central reflecting system, an objective between each end reflector and the central reflecting system, an inner frame by which the two objectives are carried and which extends continuously between the two objectives, and, on one or both sides of the central reflecting system, a tubular member extending within the base casing from close to the end reflector towards the central reflecting system to form a substantially closed inner column of air, at normal pressure, for the path of the beam of light proceeding from the end reflector towards the central reflecting system, the column being closed in that it is shut off from the rest of the interior of the base casing and is unconnected with the exterior of the instrument, the inner tubular member being closed by the optical members carried by the inner frame and base casing.

2. A rangefinder or like self-contained base optical measuring instrument comprising a tubular base casing, windows near the ends of the base casing, a reflector at each end of the base casing, a central reflecting system, an objective between each end reflector and the central reflecting system, an inner frame by which the two objectives are carried and which extends continuously between the two objectives, and, on one or both sides of the central reflecting system, a tubular member extending within the base casing from close to the end reflector towards the central reflecting system to form a substantially closed inner column of air, at normal pressure, for the path of the beam of light proceeding from the end reflector towards the central reflecting system, the column being closed in that it is shut off from the rest of the interior of the base casing and is unconnected with the exterior of the instrument, the objective on the one hand and the end reflector on the other hand being utilised for effecting closure of the tubular member.

3. A rangefinder or like self-contained base optical measuring instrument comprising a tubular base casing, windows near the ends of the base casing, a reflector at each end of the base casing, a central reflecting system, an objective between each end reflector and the central reflecting system, an inner frame by which the two objectives are carried and which extends continuously between the two objectives, and, on one or both sides of the central reflecting system, a tubular member extending within the base casing from close to the end reflector towards the central reflecting system to form a substantially closed inner column of air, at normal pressure, for the path of the beam of light proceeding from the end reflector towards the central reflecting system, the column being closed in that it is shut off from the rest of the interior of the base casing and is unconnected with the exterior of the instrument, the objective on the one hand and the adjacent window on the other hand being utilised for effecting closure of the tubular member.

4. A rangefinder or like self-contained base optical measuring instrument comprising a tubular base casing, windows near the ends of the base casing, a reflector at each end of the base casing, a central reflecting system, an objective between each end reflector and the central reflecting system, an inner frame by which the two objectives are carried and which extends continuously between the two objectives, and, on one or both sides of the central reflecting system, a tubular member extending within the base casing from close to the end reflector towards the central reflecting system to form a substantially closed inner column of air, at normal pressure, for the path of the beam of light proceeding from the end reflector towards the central reflecting system, the column being closed in that it is shut off from the rest of the interior of the base casing and is unconnected with the exterior of the instrument, the objective on the one hand and the end reflector and the adjacent window on the other hand being utilised for effecting closure of the tubular member.

5. A rangefinder or like self-contained base optical measuring instrument comprising a tubular base casing, windows near the ends of the base casing, a reflector at each end of the base casing, a central reflecting system, an objective between each end reflector and the central reflecting system, an inner frame by which the two objectives are carried and which extends continuously between the two objectives, and, on one or both sides of the central reflecting system, a supplementary length of tubing interposed between the inner frame and the end reflector to form a substantially closed inner column of air, at normal pressure, for the path of the beam of light proceeding from the end reflector towards the central reflecting system, the column being closed in that it is shut off from the rest of the interior of the base casing and is unconnected with the exterior of the instrument, the objective on the one hand and the end reflector on the other hand being utilised for effecting closure of the supplementary tubing.

6. A rangefinder or like self-contained base optical measuring instrument comprising a tubular base casing, windows near the ends of the base casing, a reflector at each end of the base casing, a central reflecting system, an objective between a central reflecting system and the central reflecting system, an inner frame by which the two objectives are carried and which extends continuously between the two objectives, and, on one or both sides of the central reflecting system, a supplementary length of tubing interposed between the inner frame and the end reflector to form a substantially closed inner column of air, at normal pressure, for the path of the beam of light proceeding from the end reflector towards the central reflecting system, the column being closed in that it is shut off from the rest of the interior of the base casing and is unconnected with the exterior of the instrument, the objective on the one hand and the adjacent window on the other hand being utilised for effecting closure of the supplementary tubing.

7. A rangefinder or like self-contained base optical measuring instrument comprising a tubular base casing, windows near the ends of the base casing, a reflector at each end of the base casing, a central reflecting system, an objective between each end reflector and the central reflecting system, an inner frame by which the two objectives are carried, and, on one or both sides of the central reflecting system, a supplementary length of tubing interposed between the inner frame and the end reflector, to form a substantially closed inner column of air, at normal pressure, for the path of the beam of light proceeding from the end reflector towards the central reflecting system, the column being closed in that it is shut off from the rest of the interior of the base casing and is unconnected with the exterior of the instrument, the supplementary length of tubing being connected by a flexible connection to the adjacent end of the inner frame so that the objective in the latter forms one closure and being connected by a flexible connection to the end reflector or to the adjacent window for the other closure.

8. A rangefinder or like self-contained base optical measuring instrument comprising a tubular base casing, windows near the ends of the base casing, a reflector at each end of the base casing, a central reflecting system, an objective between each end reflector and the central reflecting system, an inner frame by which the two objectives are carried, and, on one or both sides of the central reflecting system, a supplementary length of tubing interposed between the inner frame and the end reflector to form a substantially closed inner column of air, at normal pressure, for the path of the beam of light proceeding from the end reflector towards the central reflecting system, the column being closed in that it is shut off from the rest of the interior of the base casing and is unconnected with the exterior of the instrument, the supplementary length of tubing being arranged to overlap the adjacent end of the inner frame in sleeve fashion with a degree of clearance between the two but insufficient to allow free flow of air between them, with a similar overlap connection at the other end of the supplementary length of tubing.

J. MARTIN STRANG.